July 3, 1956 E. M. GORE 2,753,396

SYNCHRONIZING APPARATUS

Filed April 29, 1954 5 Sheets-Sheet 1

INVENTOR.
ERNEST M. GORE

BY Olin Mitchell
ATTORNEY

INVENTOR.
ERNEST M. GORE
BY Olin J. Mitchell
ATTORNEY

July 3, 1956 E. M. GORE 2,753,396

SYNCHRONIZING APPARATUS

Filed April 29, 1954 5 Sheets-Sheet 3

INVENTOR.
ERNEST M. GORE

BY Chris V. Mitchell
ATTORNEY

INVENTOR.
ERNEST M. GORE
BY Olin J. Mitchell
ATTORNEY

INVENTOR.
ERNEST M. GORE
BY Ohio D. Mitchell
ATTORNEY

United States Patent Office 2,753,396
Patented July 3, 1956

2,753,396

SYNCHRONIZING APPARATUS

Ernest M. Gore, Merchantville, N. J., assignor to Radio Corporation of America, a corporation of Delaware Application April 29, 1954, Serial No. 426,481

16 Claims. (Cl. 178—69.5)

The present invention relates to new and improved synchronizing apparatus for electrical signal generators and, more particularly, to a system for locking in a remote (slave) television transmitter with a local (master) transmitter.

More specifically, the present invention is concerned with an improved synchronizing lock-in arrangement for synchronously relating the operation of remote and local sync generators in present-day television transmitting apparatus.

In accordance with conventional television practice, television transmitting stations transmit a composite signal which comprises a video component, a synchronizing component and a blanking component. Generally, the synchronizing and blanking components are generated by a sync signal generating system preferably located at the point of image pick-up. A version of the synchronizing and blanking information is supplied to the image pick-up device or devices for synchronization of the scanning action which is employed in the production of the video signal. The synchronizing and blanking information is then mixed with the resultant image or video signal to produce the composite signal which is transmitted through the modulation of a radio frequency carrier wave.

The sync signal generator is normally controlled by a master oscillator operating at some selected multiple of the image line frequency. In order to avoid drifting in the operating frequency of the master oscillator with the attendant irregularities in the reproduced television image, the master oscillator is ordinarily linked to some standard frequency source such, for example, as the local 60-cycle power supply system. Such apparatus is well-known in the art and a detailed description of a widely used system may be found in a paper by Smith and Bedford, entitled "A precision television synchronizing signal generator," RCA Review, July 1940. Such a system is usually employed where only one sync signal transmitting chain is used or where program material originates only from scanning equipment operated by the local sync signal generator.

In a situation wherein it is desired to transmit or re-transmit program material originating from a remote location, however, it becomes necessary to supply some means for locking in the several sync generators. This lock-in feature is generally necessary, since the remote pick-up equipment may be operated on an entirely different public utilities power supply from that which energizes the local equipment. Thus, in the transmission of such special effects as "lap dissolves," video "wipes" and the like, it is necessary to maintain precise synchronism and phasing between the two signals undergoing the special effects processing. For example, it is well-known that failure to maintain proper lock-in between two superimposed television signals creates the effect of one picture drifting past the other. Correspondingly, improper synchronization in the case of a lap dissolve produces an objectionable displacement between the pictures being "dissolved." In view of the importance of synchronization lock-in between local and remote television sync generators, many varied proposals have been set forth in the past for effecting such synchronization. Some prior art proposals have required the constant attention of a skilled operator in maintaining the synchronism, while others have required wide band signal channels between the local and remote stations for the purpose of conveying that information regarding lack of synchronization which is necessary for effecting slippage of one sort of another of one of the sync generators for the purpose of bringing about coincidence of the sync signals.

It is a primary object of the present invention to provide new and improved sync generator lock-in apparatus, which apparatus is completely automatic in operation.

As alluded to briefly above, certain prior art proposals have required means for causing slippage of the locally produced transmitter sync signals in order to bring about coincidence of such local signals with the signals received from the remote station. While arrangements such as these are quite effective and require no onerous amount of lock-in equipment for a television transmitter station, it is desirable to limit the amount of equipment which constitutes a mobile or field pick-up station, so that the remote pick-up may be operated with a minimum of synchronization generator apparatus.

Thus the present invention has for another of its objects that of providing a synchronization lock-in system wherein the locking in is effected at the remote station through the agency of error detection apparatus located at the local or master station. In this manner, the bulk of the synchronizing equipment may be conveniently maintained at the master site with only the bare minimum of sync pulse generating equipment being required for the remote pick-up stations.

Another object of the invention is that of providing synchronization lock-in equipment which does not require a wide band channel for the transmission of synchronizing information to the remote or slave pick-up site.

The matter of lock-in between remotely located synchronizing generators is additionally complicated by the fact that present-day television standards require interlacing of alternate fields. That is, for example, in the standard 525 line interlaced television system having a 30-frames-per-second repetition rate, each one of the two fields comprising a frame is displaced from its companion field by one-half of a television line interval. Hence, in an interlaced television signal successive groups of line sync pulses embraced by the field blanking intervals are not symmetrical with respect to the field blanking intervals.

A still further object of the invention, therefore, is that of providing means for effecting lock-in between a remotely generated sync signal and a locally generated signal, which means are effective in the case of interlaced scansion standards.

In general, the present invention contemplates the synchronization of a remote television pick-up and sync generator with a local or master generator in two successive stages of operation, both of which are automatic. In accordance with a specific embodiment to be described herein, the remotely generated or slave signals are picked up at the master site and compared first at a frame rate with the local signals whereby to produce an error signal which is indicative of the state of a synchronism between the two signals. Information necessary for controlling the remote sync generator is provided through the agency of an audio frequency oscillator whose output tone, phase- and frequency-modulated by the error information, is transmitted to the remote slave site via some narrow band link such as a telephone line. The oscillator tone is selected to be a discrete fraction of the line scanning frequency employed in the system, so that when the audio tone is received at the remote station, it may be multiplied by a suitable factor and employed directly for control of the remote sync generator. Means are additionally provided in accordance with the invention for automatically switching from frame rate error detection to line rate detection once the frame rates are properly synchronized. Error detection at the line rate then provides what may be termed a fine adjustment of the synchronization.

Additional objects and advantages of the present invention will become apparent to persons skilled in the art from a study of the following detailed description of the accompanying drawing in which.

Figure 1:
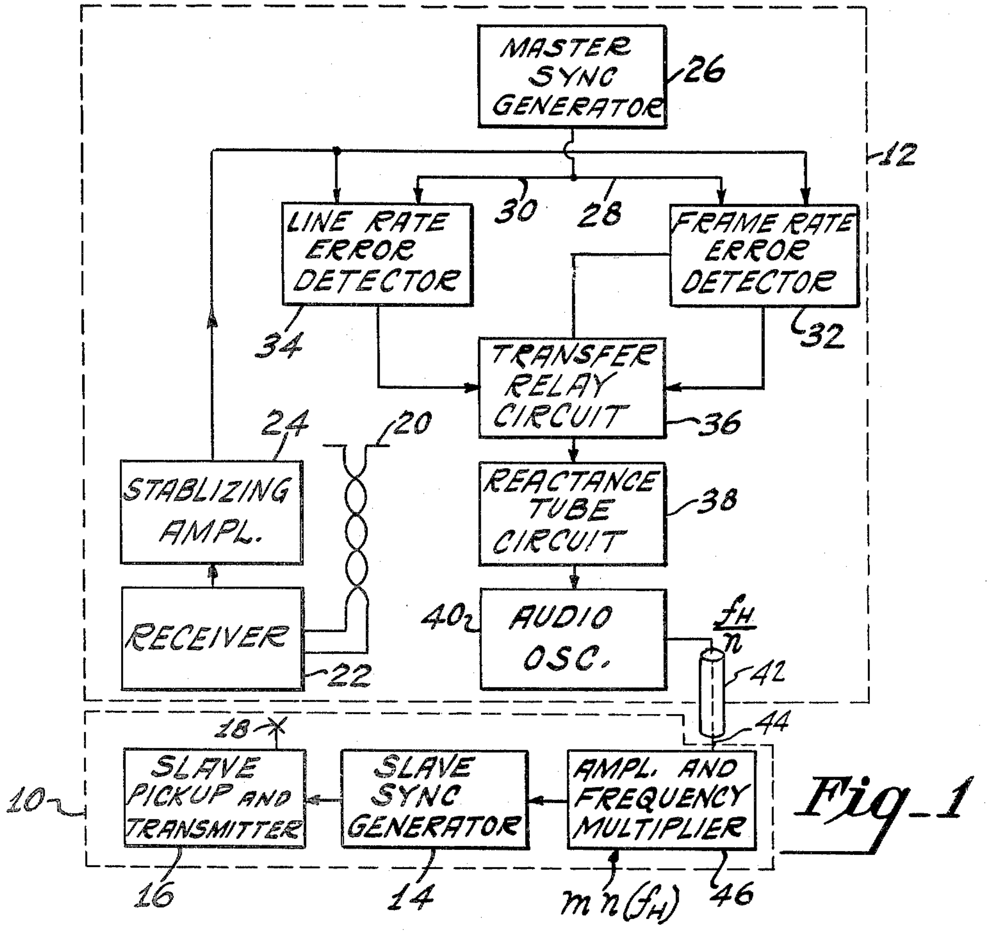
Fig. 1 is a block diagram of a system in accordance with the invention.

Referring to the drawing and, particularly to Fig. 1 thereof, the dotted line rectangle illustrates diagrammatically a slave television transmitter which may, for example, be located in the field and which is to be synchronized with a master station shown within the dotted line rectangle 12. The slave site includes a synchronizing generator 14 and the usual image pick-up device or devices of transmitter apparatus 16 which modulates a radio frequency carrier wave with the video and synchronizing information for transmission via an antenna 18. Alternately, the television signals may be conveyed by a coaxial cable, for example. Since the slave sync generator 14 and the other transmitter apparatus 16 do not specifically constitute parts of the present invention, they need not be described in detail herein. It may, however, be noted that the sync generator 14 may be of the type which includes a master oscillator operating at a frequency which is a predetermined multiple of the television line scanning frequency (e. g. 31.5 kilocycles).

The composite signal from the transmitter 16 is intercepted at the master site 12 by an antenna 20 and is applied to a receiver 22 for detection. The composite signal is then coupled to a stabilizing amplifier 24 which removes undesired, spurious information from the signal. Also included at the master site 12 is the master synchronization generator 26 which may be of any well-known variety such, for example, as that described in detail in the above-cited RCA Review article. The master sync generator 26 provides television field and line synchronization pulses which are applied via leads 28 and 30 to frame rate error detector 32 and line rate error detector 34, respectively. Also applied to the frame rate and line rate error detectors is the output of the stabilizing amplifier 24 which comprises the synchronizing pulses received from the remotely located slave generator.

Since a specific embodiment of the invention will be described hereinafter, it is sufficient to note at this point that the synchronization apparatus of the invention compares the received slave sync information with the locally produced master sync first of all in the frame rate error detector 32. The information derived from detector 32 is applied via a transfer relay circuit 36 to a reactance tube circuit 38 which, in turn, effects phase- and frequency-modulation of a wave produced by oscillator 40. As has been mentioned previously supra, it is an advantage of the present invention that error detection is accomplished at the master site, so that the synchronizing information necessary for locking-in of the slave sync generator may be transmitted to the slave site through a narrow band channel. The transmission path for such synchronizing information is afforded by a telephone link 42 connecting the master apparatus audio oscillator 40 to the input terminal 44 of amplification and frequency multiplication apparatus 46 located at the slave site. In order that the necessary information may be transmitted to the slave site without resort to wide band transmission links such as coaxial cables and the like, the present invention conveys the information through the agency of an audio frequency wave which is, for purposes of simplicity, selected as one having a frequency which is a discrete fraction of the frequency of the sync generator oscillator of the slave apparatus. Thus, for example, the basic frequency of the audio oscillator 40 has been chosen in accordance with one specific form of the invention to be equal to one-third of the horizontal or line frequency. Assuming, therefore, a conventional line frequency $f_h$ of 15.75 kilocycles, the basic frequency of audio oscillator 40 would be equal to $$\frac{f_h}{n}$$

or 5.25 kilocycles (where $n=3$).

As thus far described, the operation of the apparatus of Fig. 1 is such that the received sync pulses from the slave transmitter are compared with the locally produced master sync signals at a television frame rate (i. e. every thirtieth of a second). The error or degree of misphasing is detected by apparatus 32 and employed in modulating the phase of the audio oscillator wave via the reactance tube circuit 38. The information thus provided is coupled through the telephone line 42 to the amplifier and frequency multiplier 46 which may, for example, have a multiplication factor of *mn*, where "*n*" is as set forth above and "*m*" is the factor by which the horizontal frequency differs from the synchronizing oscillator frequency. That is to say, in conventional apparatus where $f_h$ is equal to 15.75 kilocycles and the synchronizing oscillator has a basic frequency of 31.5 kilocycles, "*m*" is equal to 2. Thus the frequency multiplier 46 performs the function of converting the 5.25-kilocycle audio tone to a 31.5-kilocycle wave which may be employed directly, for example, in driving the master oscillator of the slave sync generator. It is also within the contemplation of the present invention that the frequency-multiplied audio tone may be compared with the 31.5-kilocycle wave of the slave sync generator's master oscillator to derive a correction signal for correcting the master oscillator of the slave generator as by means of a reactance tube device. In either event, the audio tone as modulated by the information from the frame rate error detector 32 at the master site is employed to effect synchronism of the slave generator oscillator and the master generator oscillator. Once such synchronism has been produced from the output of the frame rate error detector, the relay circuit 36 automatically shifts to its second state of operation wherein it connects the output of the line rate error detector 34 with the reactance tube circuit. In this second condition of operation, the received slave sync is compared as to phase with the locally generated master sync at a line rate whereby to furnish extremely accurate information regarding the phase relationship between the master and slave sync. This information is then applied to the reactance tube circuit 38 in such manner as to modulate the wave furnished by the audio oscillator 40 with the necessary information for bringing about exact synchronism between the slave sync generator 14 and the master sync generator 26.

It should be apparent from the foregoing that the present invention provides relatively simple means for synchronizing a remote slave sync generator with a local master sync generator in such manner that error detection is performed at the master site, first at a frame rate for correct frame alignment and, secondly, at a line rate for an accurate correction. The information necessary for correcting the phase and frequency of the master oscillator at the slave site is, moreover, of such nature as to be communicable via a narrow band transmission channel such as a telephone line.

Figure 2:
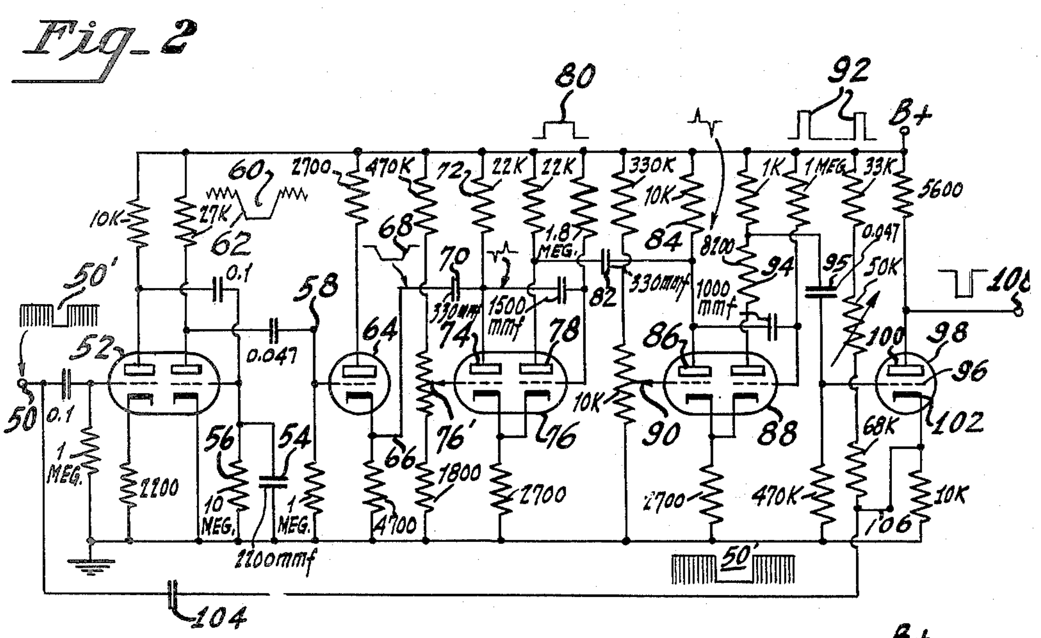
Figure 3:
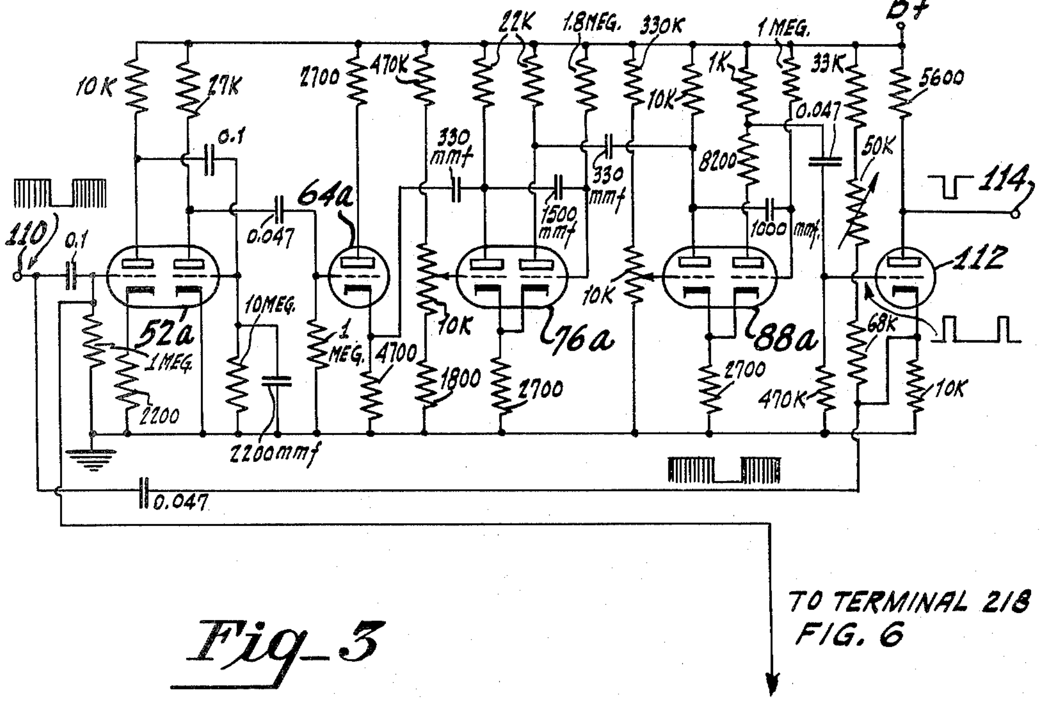
Figure 4:
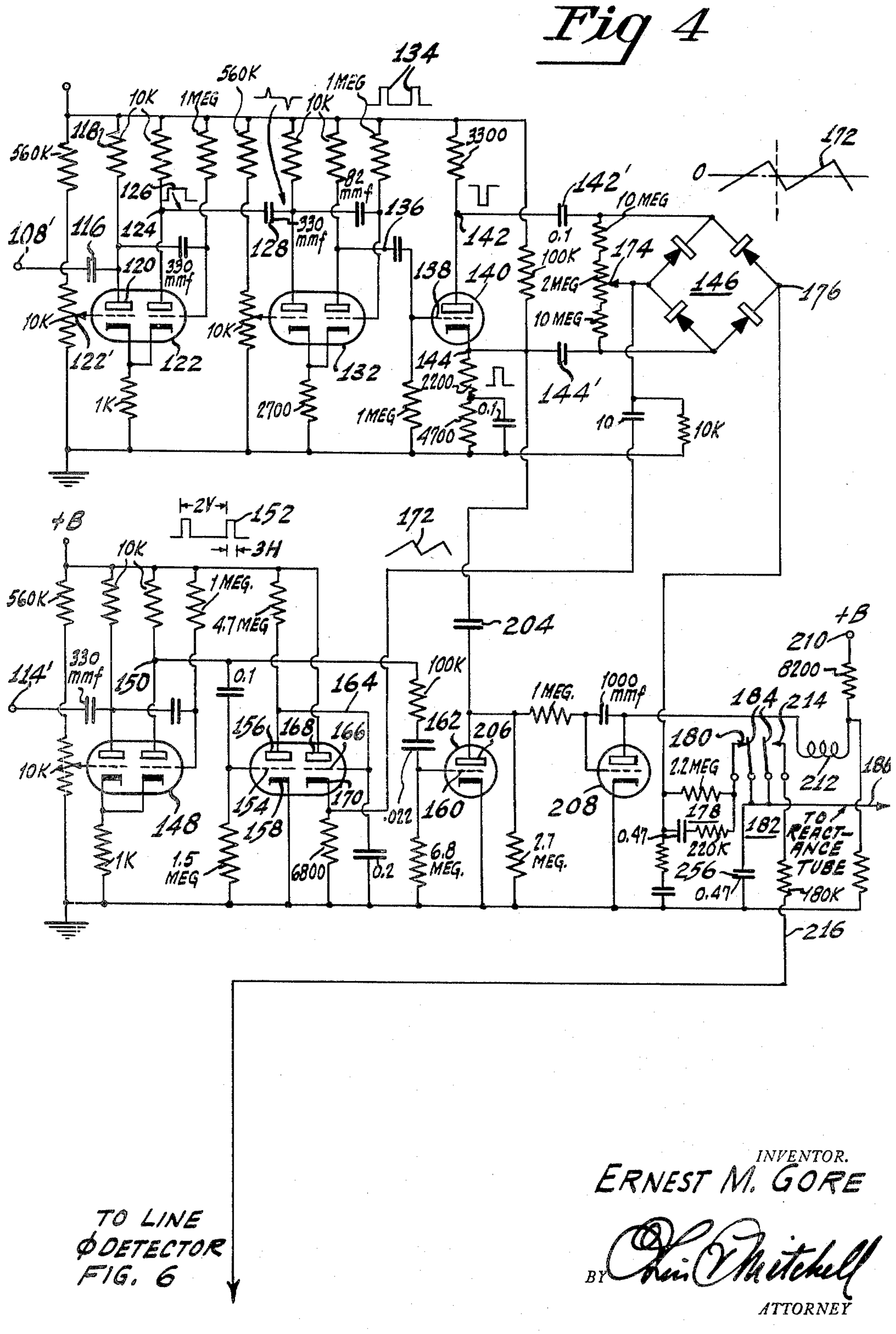

In view of the novelty of the apparatus which has been indicated diagrammatically in the block form of Fig. 1, specific circuitry capable of performing the several functions described is illustrated in detail in Figures 2 through 6 of the drawing. Figures 2, 3 and 4 disclose circuitry which may be employed in performing the functions of the frame rate error detector 32 and the transfer relay circuit 36 of Fig. 1. Referring to Fig. 2, therefore, terminal 50 is designated for connection to the master sync generator 26 so that the composite synchronizing signal from generators 26 may be applied to terminal 50. That is to say, the composite horizontal and vertical sync information of the master generator 26 is applied to terminal 50 of Fig. 2 and is subjected to two stages of amplification indicated by the double triode 52. It will be noted that the control electrode circuit of the right-hand portion of tube 52 includes an integrating circuit comprising the parallel combination of capacitor 54 and resistor 56. The integrating circuit performs the function of attenuating the higher frequency horizontal sync pulses of the composite wave 50′ whereby to provide at terminal 58 a wave form such as that indicated by reference numeral 60 in which the vertical synchronizing pulses 62 extend in the negative direction. Wave form 60 is next applied to the control electrode of a clipper tube 64 of conventional form which provides at its cathode output terminal 66 a wave form such as that shown at 68 in which the vertical synchronizing pulses are free of the attenuated horizontal sync pulses. The negative-going vertical synchronizing pulses of wave form 68 are differentiated through the agency of capacitor 70 and resistor 72 to provide alternate negative and positive spikes at the anode 74 of one-half of a double triode 76. The two tubes comprising the double triode 76 are connected to form a multi-vibrator of the well-known mono-stable variety which, for purposes of illustration, may be assumed to be of the type in which the tube portion including anode 78 is normally conducting. Thus the negative spike portion of the differentiated wave form appearing at anode 74 triggers the multivibrator 76 in such manner that it produces at its anode 78 a positive pulse 80 whose leading edge is coincident with the leading edge of the vertical sync pulse 62 and whose duration depends upon the setting of the potentiometer 76′ to which the control electrode of that portion of the tube including anode 74 is adjustably connected.

The setting of the potentiometer 76′ is normally established such that the trailing edge of pulse 80 extends beyond the vertical synchronizing pulse interval. Positive pulse 80 is then differentiated by capacitor 82 and resistor 84 to provide alternate positive and negative spikes at the anode 86 of a dual triode 88 which is also connected as a mono-stable multi-vibrator. Potentiometer 90 of multi-vibrator 88 is set so that the output pulse 92 at terminal 94 is of quite short duration, not exceeding one-half of a television line interval. The positive pulses 92 are coupled via capacitor 95 to the control electrode 96 of a coincidence detector triode 98 which further includes an anode 100 and cathode 102. Input terminal 50 of Fig. 2 is also coupled via capacitor 104 and lead 106 to the cathode 102, whereby to apply to the cathode the composite synchronizing pulse 50′ from the master sync generator 26. It will be noted that the polarity of wave 50′ is such that the line and field sync pulses extend in the negative direction.

As thus far described, therefore, the input wave to the control electrode 96 of tube 98 comprises positive going pulses 92 occurring at the television field rate of 60 C. P. S., while the input to its cathode 102 comprises the composite master sync wave including both vertical and horizontal pulses. Assuming that tube 98 is so biased beyond cut-off that neither the positive going pulses 92 applied to its control electrode nor the negative wave 50′ applied to its cathode can render the tube conductive, the tube will draw anode current only upon coincidence of its two input waves. In view of the fact that the conventional interlaced standards of television scanning require that alternate vertical or field pulses be displaced by one-half of a line interval in addition to the field interval, coincidence in tube 98 will occur only near the beginning of every second television field. That is to say, terminal 108 will experience a negative pulse corresponding to a television line synchronizing pulse near the beginning of every frame.

Since the circuitry of Fig. 3 is substantially identical to that of Fig. 2 it need not be described further. It is to be noted, however, that its input terminal 110 has applied to it the composite synchronizing wave form received from the slave site. This wave is operated upon in stages 52*a*, 64*a*, 76*a* and 88*a* corresponding exactly to those described with respect to Fig. 2 whereby positive pulses occurring at television field rate are applied to the control electrode of coincidence detector tube 112. The composite received slave sync wave is applied to the cathode of tube 112 so that a single pulse of negative polarity is furnished to output terminal 114 near the commencement of each television frame interval.

The potentiometer 76′ can be adjusted to "select" any horizontal sync pulse following the vertical synchronizing interval. While it may be preferable to select the first horizontal pulse (i. e. in the circuits of Figures 2 and 3), it should be understood that the second, third, fourth or other pulse may be selected with the same result, so long as the same pulse is selected by the circuits of Figures 2 and 3.

Figure 4 includes a pair of input terminals 108′ and 114′ which are adapted for connection, respectively, to the output terminals 108 and 114 of Figures 2 and 3. Thus the negative synchronizing pulse at terminal 108 in Fig. 2 is coupled via the differentiating circuit comprising capacitor 116 and resistor 118 to the anode 120 of one-half of a dual triode 122 which is connected in the form of a mono-stable multi-vibrator to be described hereinafter. The positive pulse provided by multi-vibrator 122 at terminal 124 is shown at 126 and has a repetition rate of 30 per second. Pulses 126 are differentiated by capacitor 128 and resistor 130 and the resultant negative spikes trigger multi-vibrator 132 which may be termed a "gating pulse generator" which produces frame rate positive pulses 134 at terminal 136. Since the pulses 134 are intended to be applied to a phase comparison device, their duration is selected to provide a greater amount of energy than is contained in the horizontal sync pulses provided to terminal 108′. Thus, for example, each of pulses 134 may have a duration of one-half of a television line interval. The pulses 134 at terminal 136 are applied to the control electrode 138 of a conventional phase-splitter 140 which provides negative-going and positive-going pulses at its terminals 142 and 144, respectively, for application via capacitors 142′ and 144′ to the input terminals of a phase comparison circuit 146. Since the phase comparison circuit 146 is of well-known form, it need not be described in detail here, but its operation will become apparent from the following portion of the specification.

Terminal 114′ of Fig. 4 receives the frame rate pulses from terminal 114 of Fig. 3 and applies them to a multi-vibrator 148, also of the mono-stable variety. The output of multi-vibrator 148 at terminal 150 comprises a series of pulses having a repetition rate equal to the television frame rate and a duration of, for example, three horizontal line pulses. These pulses, indicated at 152, are applied simultaneously to the control electrode 154 of a sawtooth wave generator which additionally includes anode 156 and cathode 158, and to the control electrode 160 of a coincidence detector triode 162. The output of the sawtooth wave generator is coupled via lead 164 to the control electrode 166 of a cathode follower stage including anode 168 and cathode 170. The sawtooth wave of frame frequency shown at 172 is applied to the input terminal 174 of the phase comparator 146. As is understood by those skilled in the art to which the present invention is directed, the phase comparator 146 forms a type of balanced bridge circuit so that it provides at its output terminal 176 a voltage whose polarity and amplitude are functions, respectively, of the direction and amount of the out-of-phase condition between frame rate pulses 134 and the frame rate sawtooth wave 172. Thus, for example, when the pulses 134 occur at the zero point in the sawtooth wave 172, the output of the phase comparator at terminal 176 will be a predetermined value which may, by way of illustration, be assumed as zero for the condition of perfect coincidence. In order to establish the proper times of occurrence of the pulses 134, the multi-vibrator 122 is adjusted by means of the potentiometer 122' to have an output pulse 126 of a certain duration, so that the trailing edge of pulse 126 (after differentiation) will trigger the multi-vibrator 132 to produce a pulse 134 which occurs at a time which should coincide with the zero point of the sawtooth 172 when the received slave sync is in phase with the locally generated master sync. The output voltage from terminal 176 of the phase comparator circuit is fed through a "smoothing" or stabilizing network 178 to provide a control voltage at the fixed terminal 180 of the relay system 182. The switching terminals 184 of the relay arrangement are shown in position for transmitting the information from phase comparator 146 to the reactance tube lead 186 which is designated for connection to the circuitry of Fig. 5 and, specifically, to terminal 186' thereof.

Figure 5:
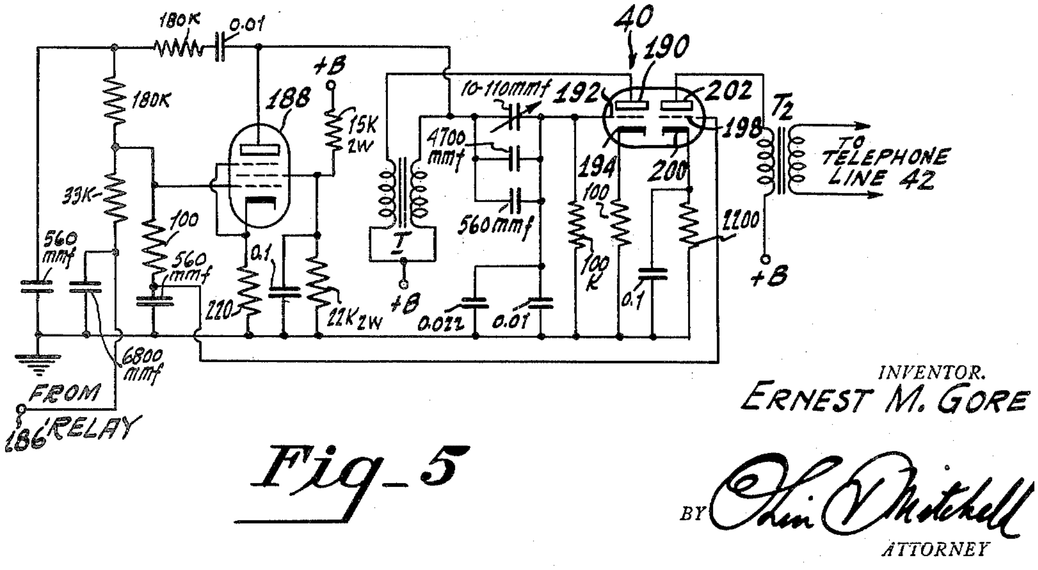
Figures 2 through 6 illustrate schematically various component circuits making up the synchronization apparatus which is located at the master site.

Fig. 5 illustrates a reactance tube 188 of well-known form connected across the tuned grid circuit of the audio oscillator 40 which includes anode 190, control electrode 192 and cathode 194. The oscillator 40 further includes a conventional anode-to-grid feed-back arrangement comprising the transformer "T." Assuming that oscillator 40 is producing an output wave of sinusoidal form and of a basic frequency of 5.25 kilocycles as set forth earlier, the action of reactance tube 188 will be such as to vary the frequency of oscillation of the oscillator 40 in accordance with the voltage derived from wave comparator 146. Thus, by way of illustration, if the phase comparator output is of such phase as to indicate that the slave synchronizing generator is lagging with respect to the master sync generator, the reactance tube 188 will cause the oscillator 40 to be modulated as to frequency whereby its output wave will, when multiplied by the slave apparatus 46 be of such frequency as to speed up the slave synchronizing oscillator in an amount sufficient to bring the slave sync into phase with the master sync. In the interest of completeness of description, it should be noted that the output of oscillator 40 is applied to the control electrode 198 of an amplifier which includes cathode 200 and anode 202. The amplified oscillations are then coupled via transformer $T_2$ to the telephone line 42 of Fig. 1. This action as described constitutes the first step in the locking-in of the slave sync generator with the master sync generator and occurs, as explained at television frame rate. Referring again to Fig. 4, it has been pointed out that the frame rate pulses 152 at the output terminal 150 of multivibrator 148 are, in addition to being fed to the sawtooth generator control electrode 154, also applied to the control electrode 160 of the coincidence detector 162. The positive pulses at cathode 144 of the phase splitter 140 in Fig. 4 are also applied via coupling capacitor 204 to the anode 206 of coincidence detector tube 162 whereby that tube is adapted to conduct only upon the coincidence of pulses 152 and the positive pulses derived from pulses 134 at the cathode of the phase splitter 140. Upon such coincidence of the pulses and conduction of tube 162, its output current is amplified by the D. C. amplifier 208 whereby anode current flows through tube 208 from the terminal 210 and through the relay coil 212 in such manner as to move the relay switching terminals 184 to the right. That is to say, once the frame rate pulses 134 and 152 coincide, thereby indicating proper phase relationship of the master and slave sync pulses when compared at the frame rate, the transfer relay circuit is switched over to connect the reactance tube lead 186 with terminal 214 of the relay. This condition of the relay circuit effectively connects the reactance tube lead with the lead 216 designated for connection to the line phase detector. When the relay portion has been switched as described to place the reactance tube lead 186 in communication with lead 216, the apparatus of the invention commences the second stage of its phase error detection, namely, that stage wherein the master and slave sync pulses are compared at a line rate.

Figure 6:
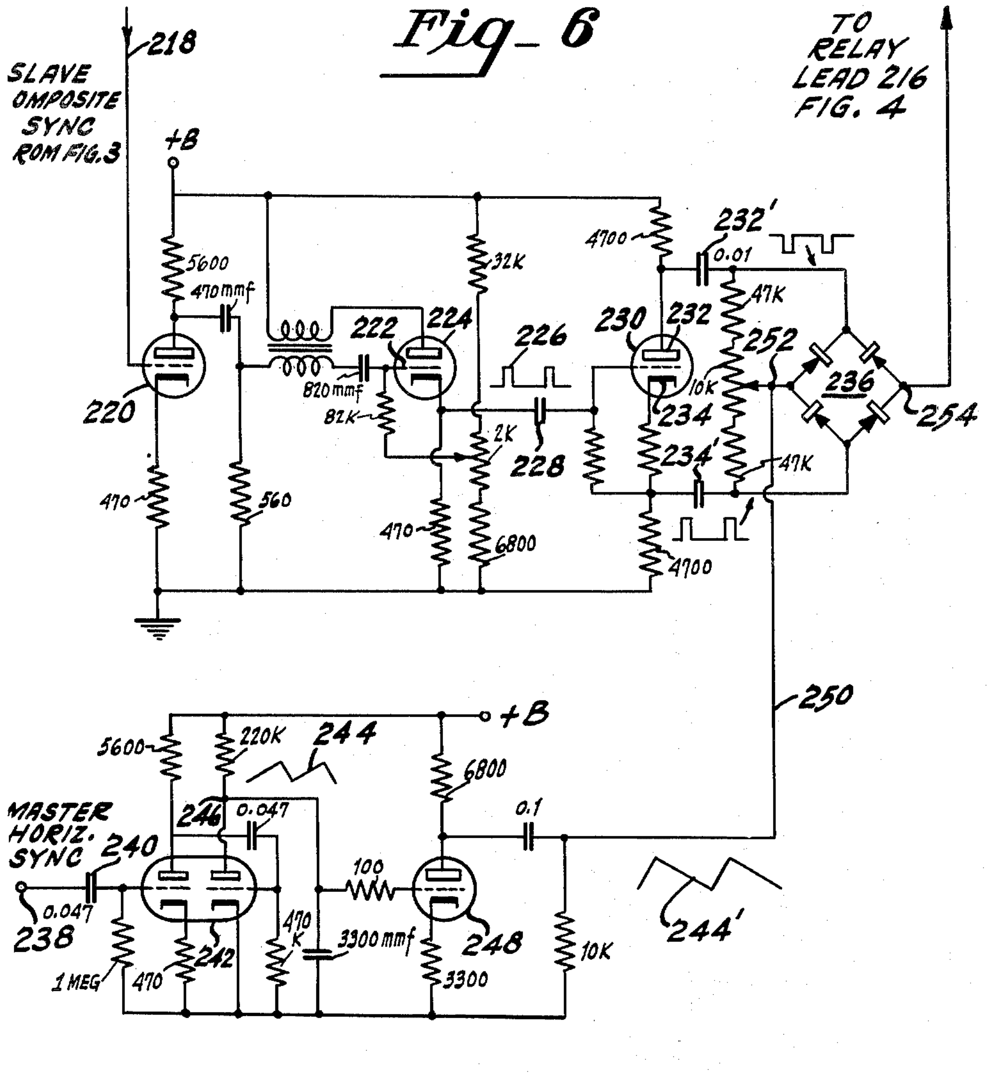

Referring now to Fig. 6, input terminal 218 is adapted for connection to the composite slave sync input terminal of the circuit of Fig. 3, so that terminal 218 receives the negative going composite slave sync signals. These signals are amplified in the tube 220 and applied to the control electrode 222 of tube 224 which is connected in circuit as a blocking oscillator operative at television line frequency. The output pulses 226 from blocking oscillator 224 are coupled via capacitor 228 to the control electrode of a phase splitter circuit 230. The anode and cathode 232 and 234 of the phase splitter 230 are coupled, respectively, via capacitors 232' and 234' to the opposite terminals of a line rate phase comparator circuit 236 whereby to apply to those terminals the negative and positive versions of the wave 226. Terminal 238 receives the master horizontal synchronizing pulses from the master sync generator 26 of Fig. 1 and applies them via capacitor 240 to the input terminal of a 15.75 kilocycle sawtooth generator 242 of conventional form. The output of generator 242 is shown as the sawtooth wave form 242 appearing at terminal 246 and is applied to the input of an amplifier stage 248. The amplified and inverted sawtooth 244' is applied via lead 250 to the input terminal 252 of comparator circuit 236. Circuit 236 is similar in nature to the frame rate phase comparator 146 described above, with the exception that it compares line rate pulses with line rate sawtooth waves. At the output terminal 254 of circuit 236 there will be available a voltage whose polarity and amplitude are, respectively, functions of the direction and amount by which the slave horizontal sync pulses are out of phase with the sawtooth wave form 244' derived from the master horizontal sync pulses. Terminal 254 is, in turn, designated for connection to the lead 216 of Fig. 4. Since, as has been stated, the condition of relay 182 during the second stage of operation of the present invention is such that lead 216 is electrically connected to the reactance tube terminals 186 and 186', the error voltage from terminal 254 of the line rate error detector is conveyed through contacts 214 and 184 to the smoothing capacitor 256 from which it is applied to the reactance tube for controlling the audio oscillator 40. In a manner substantially similar to that described in connection with the frame rate error detection, the error information at terminal 254 causes the reactance tube 188 to vary the frequency and phase of oscillation of the oscillator 40 in such manner as to vary its output frequency in an amount sufficient to speed up or slow down the master oscillator of the slave sync generator for effecting synchronization of the slave sync generator with the master sync generator. Again the correction information is applied via amplifier anode 202 and transformer $T_2$ to the telephone line 42 for conduction to the slave frequency multiplier 46.

Although the foregoing describes fully the operation of one form of the present invention in which locking-in of a slave sync generator with respect to a master sync generator is effected first at a frame rate and then at a line rate for preciseness, it should be understood that, if the slave sync generator should at some later time fall out of phase with respect to the master sync generator, the coincidence detector 162 will fail to draw current. Such non-conduction of the coincidence detector will de-energize the relay winding 212 whereby to cause the switch elements 184 to move back to their original position as shown in Fig. 4, whereby to place the reactance tube lead 186 in electrical communication with the output terminal 176 of the frame rate phase comparator circuit 146. The sequence of operations would then be repeated as described.

Figure 7:
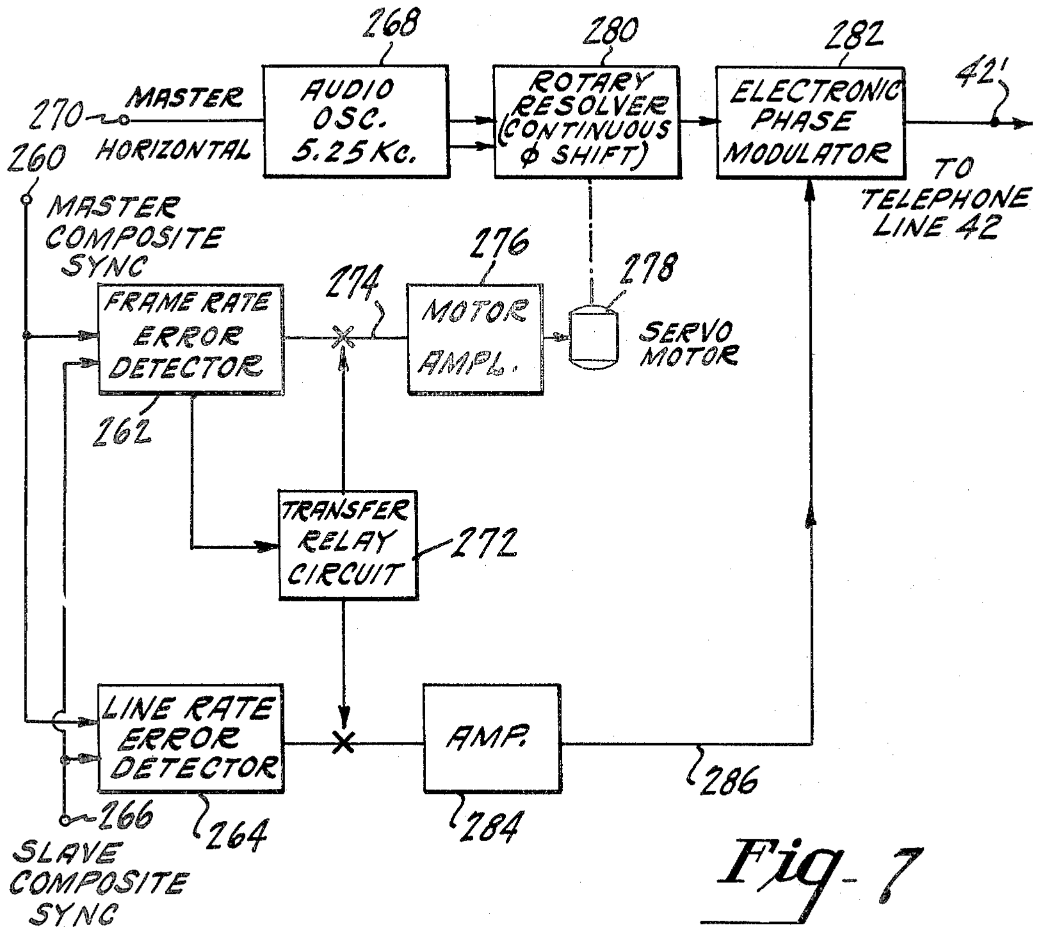
Fig. 7 is a block diagram of another form of the invention.

Fig. 7 illustrates another form of the invention capable of performing the successive phase error detections in which certain of the operations are performed through the agency of electromechanical means but in which the basic principles of the invention are carried out. In this embodiment, the master composite synchronizing wave form is applied to terminal 260 which communicates with a frame rate error detector 262 and a line rate error detector 264. The composite slave sync as received from the slave site is available at its terminal 266 from which it is applied to the frame and line rate error detectors 262 and 264, respectively. An oscillator 268 having a basic frequency of 5.25 kilocycles is maintained in strict phase synchronization with respect to the master sync oscillator of the master site by the application of horizontal sync pulses from the master sync generator to terminal 270. The frame rate error detector 262 may for, purposes of simplicity, be considered as of the type described in detail in connection with the frame rate error detector 32 of Fig. 1, while the line rate detector 264 may similarly be considered the same as detector 34. Additionally, the transfer relay circuit 272 in Fig. 7 is or may be identical to that described for the relay circuit 36. When the transfer circuit 272 is in condition for transmitting the information derived by the frame rate error detector 262, that information is fed via lead 274 to a motor amplifier 276 which energizes a servo motor 278 of any well-known form capable of rotating a certain number of degrees in accordance with the information applied to it. The servo motor 278, in turn, is mechanically coupled to and drives a rotary resolver 280, a description of which may be found on page 104 et seq. of vol. 21 of the MIT Radiation Laboratory Series (MacGraw-Hill Book Company), entitled "Electronic Instruments." The rotary resolver 280 may, for example, be of the type comprising a pair of stator windings and a rotor winding, such that when two voltages 90° out of phase with respect to each other are applied to its stator windings from the oscillator 268 and the error information from the frame rate indicator causes its rotor to be rotated a certain number of degrees, there will be available at its rotor winding a frequency equal to the input frequency from the oscillator 268 plus the mechanical frequency of rotation of the motor 278. Thus it will be understood that the rotary resolver 280 may be considered broadly as performing the function of the reactance tube of the circuit of Fig. 1, in that it effects phase and frequency modulation of the 5.25-kilocycle output wave of oscillator 268 as a function of the degree of misphasing between the master and slave sync as determined by the frame rate error detector 262. By way of illustration, therefore, if the error determined by the frame rate detector is such as to cause the motor 278 to rotate at a speed of 10 revolutions per second, for example, and in a certain direction indicative of a condition in which the slave sync lags with respect to the master sync, the rotor resolver 280 will give an output frequency of 5.26 kilocycles.

On the other hand, if it were the case of the slave sync's leading the master sync by the same amount, the servomotor might rotate in the opposite direction but at the same speed, thereby causing the output of the rotor resolver 280 to have a frequency of 5.24 kilocycles.

The operation of the rotary resolver may be better understood from the following example in which it is assumed that the frame rate error detector 262 is in operation:

1. Assuming that, at the initial instant, the slave frame rate lags 90° behind the master frame rate (i. e. at 30 C. P. S.), this would mean that the master vertical sync bar is in the center of the picture from the slave system.

2. The frame rate error detector will, therefore, produce a signal tending to speed up the slave sync generator so that the slave vertical sync bar advances toward coincidence with the master vertical sync bar. Since the phase advance is 90° at the 30 C. P. S. rate, the time error is $$\frac{\theta}{\omega}=\frac{\pi/2}{2\pi(30)}=\frac{1}{120}\text{ sec.}$$

3. This time error referred to 5250 C. P. S. is $$2\pi(5,250)\left(\frac{1}{120}\right)\left(\frac{180}{\pi}\right)=15,750\text{ degrees}$$

4. If the output is made to run at the constant frequency of 5,260 C. P. S. by the error detector, the signal will advance $$\frac{5260-5250}{5250}\times 360=\frac{360}{525}$$ degrees per cycle of a 5,250 C. P. S. wave 5. Thus (at this constant rate) 22,968.75 cycles (i. e. $15750\times{}^{525}/_{360}$) at 5,250 C. P. S. will elapse before the slave sync coincides with master sync (about 4.38 sec.).

6. During this interval, the resolver will be rotating at a speed of 10 R. P. S. (for a two-pole resolver) or 5 R. P. S. for a four-pole resolver.

The output of the rotary resolver is applied to an electronic phase modulator 282 which may constitute, during the stage of error detection at frame rate, a simple amplifier stage whose nature will become more fully apparent hereinafter. The output of the rotary resolver is applied via the stage 282 to the telephone line terminal 42'. Once the frame rate detector 262 has indicated coincidence of the master and slave sync, the transfer relay circuit 272 operates to connect the line rate error detector with amplifier 284. Error information derived at the line rate is thus amplified and applied via lead 286 to the electronic phase modulator 282. In this second stage of the operation of the apparatus of Fig. 7, the frame rate detector is disconnected from the servo motor 278 so that the rotary resolver is not supplied with any frame rate error information. Thus the rotary resolver 280 serves as an electromechanical conduit for the 5.25-kilocycle output audio oscillator 268, whereby to apply the same to the modulator 282.

Figure 8:
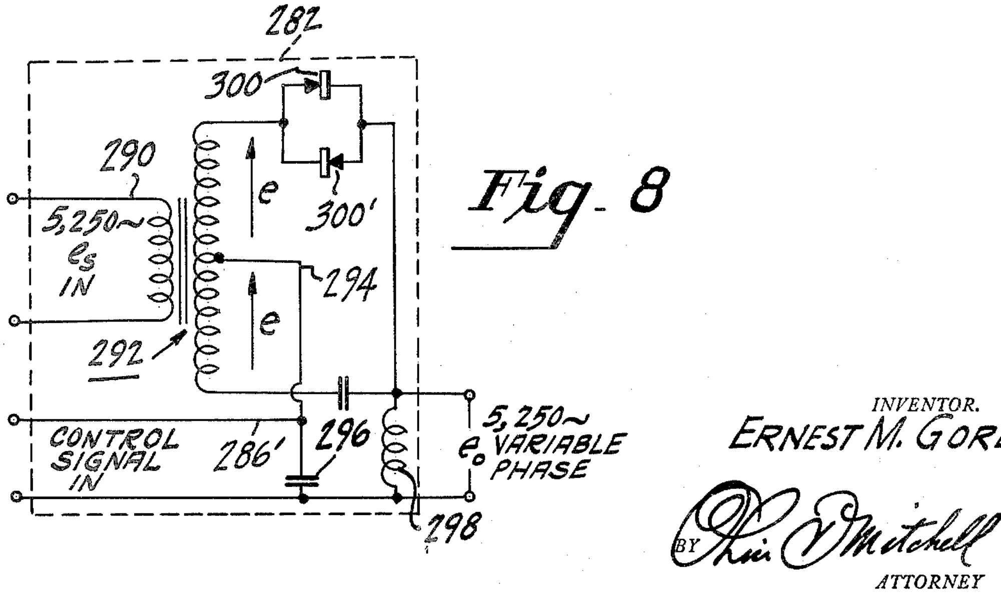
Fig. 8 is a schematic diagram of circuitry which may be employed in the apparatus of Fig. 7.

One suitable form of phase modulation which may be substituted for the block 282 is shown in Fig. 8. The audio wave $e_s$ of 5250 C. P. S. is applied to the primary winding 290 of an audio transformer 292. The control signal from the amplifier 284 is applied via lead 286' to the center tap 294 of the transformer secondary winding to provide the control voltage ($e$) which is a small signal of less than one volt. Capacitor 296 provides a low impedance bypass for 5,250 C. P. S., while the output inductance 298 is fairly large, so as to have an impedance of at least 100,000 ohms at that frequency. Diodes 300 and 300' are connected to form a "varistor" (i. e. an impedance whose small-signal A. C. resistance is a function of the direct current through it).

In the operation of the phase modulator of Fig. 8, and neglecting the shunting effect of inductance 298, it may be shown that $$e_0(\text{the output signal})=e\underline{/\theta}$$

where $$|e_0|=|e|$$

and $$\theta=-2\text{ arc tan WCR}$$

(where C and R represent the values of capacitor 296 and the varistor 300–300′).

Hence, if the error signal is such as to cause a 1-degree phase shift of the 5,250 C. P. S. wave, then the horizontal pulses of the sleve sync will be shifted through an angle of $3\times1=3$ degrees relative to the master horizontal pulses, whereby to produce accurate synchronism.

From the foregoing, it should now be apparent that the present invention affords an arrangement for providing rapid locking-in of a slave sync generator with a master generator in a first stage of operation wherein phase error detection occurs at television frame rate. Once synchronism at that rate has been effected, the second stage of operation in which error detection occurs at line rate takes place and provides accurate phase adjustment. In both stages of operation the error information is in such form as to be communicable to the slave site through such narrow band channels as a telephone line. One great advantage of the invention is that it does not require the use of a wide band channel for error information such as is necessary in accordance with prior art proposals in which the master sync must be transmitted to the slave site, thereby requiring a wide band channel. Moreover, since the error detection occurs herein at the master site through the agency of means as set forth, the inherent delays of the slave sync transmission are automatically taken into account.

Having thus described my invention, what I claim as new and desire to secure by Letters Patent is:

1. In an electrical system, remotely located first and second composite wave generators, each generator including a base oscillator from which are synchronously derived a high and a low frequency component for each composite wave, apparatus for synchronizing the operation of said second generator with said first generator, said apparatus comprising; means located at the site of said first generator for receiving the composite wave derived from said second generator; means coupled to said wave-receiving means and to said first generator for comparing the phase of the waves from said first and second generators at a rate bearing a predetermined relationship to said low frequency; a source of a carrier wave of nominal frequency bearing a predetermined fractional relationship to the frequency of said base oscillator and adapted for transmission to the site of said second generator; means coupled to said phase comparison means and to said carrier wave source for modulating the frequency of such carrier wave in accordance with the degree and direction of misphase between said first and second composite waves; a second phase-comparison means, said second phase-comparison means being adapted to compare the phase of said second composite wave with said first composite wave at a rate equal to said high frequency; transfer means responsive to said first-named phase comparison means for coupling said second phase-comparison means to said carrier wave source in such manner as to modulate said carrier wave frequency in accordance with the misphasing determined at such high frequency rate; and means for controlling said base oscillator of said second generator in response to such carrier wave.

2. In a electrical system, remotely located first and second composite wave generators, each generator including a base oscillator from which are synchronously derived a high and a low frequency component for each composite wave, apparatus for synchronizing the operation of said second generator with said first generator, said apparatus comprising: means located at the site of said first generator for receiving the composite wave derived from said second generator; means coupled to said wave-receiving means and to said first generator for comparing the phase of the waves from said first and second generators at a rate bearing a predetermined relationship to said low frequency; a source of an audio carrier wave of nominal frequency bearing a predetermined fractional relationship to the frequency of said base oscillator and adapted for telephonic transmission to the site of said second generator; means coupled to said phase comparison means and to said carrier wave source for modulating the frequency of such carrier wave in accordance with the degree and direction of misphase between said first and second composite waves; a second phase-comparison means, said second phase-comparison means being adapted to compare the phase of said second composite wave with said first composite wave at a rate equal to said high frequency; transfer means responsive to said first-named phase comparison means for coupling said second phase-comparison means to said carrier wave source in such manner as to modulate said carrier wave frequency in accordance with the misphasing determined at such high frequency rate; and means at the site of said second generator for receiving such frequency modulated carrier wave and for controlling said base oscillator of said second generator in accordance therewith.

3. In an electrical system, remotely located first and second composite wave generators, each generator including a base oscillator from which are synchronously derived a high and a low frequency component for each composite wave, apparatus for synchronizing the operation of said second generator with said first generator, said apparatus comprising: means located at the site of said first generator for receiving the composite wave derived from said second generator; means coupled to said wave-receiving means and to said first generator for comparing the phase of the waves from said first and second generators at a rate bearing a predetermined relationship to said low frequency; a source of a carrier wave of nominal frequency bearing a predetermined fractional relationship to the frequency of said base oscillator and adapted for transmission to the site of said second generator; means coupled to said phase comparison means and to said carrier wave source for modulating the frequency of such carrier wave in accordance with the degree and direction of misphase between said first and second composite waves; a second phase-comparison means, said second phase-comparison means being adapted to compare the phase of said second composite wave with said first composite wave at a rate equal to said high frequency; transfer means responsive to coincidence of said composite waves as detected by said first-named phase comparison means for electrically disconnecting said first-named phase comparison means from said carrier wave source and for coupling said second phase-comparison means to said carrier wave source in such manner as to modulate said carrier wave frequency in accordance with the misphasing determined at such high frequency rate, and means for correcting the operation of said base oscillator of said second generator in response to the received, frequency-modulated carrier wave.

4. In combination with a master television synchronizing signal generator of the type adapted for synchronously providing horizontal and vertical television synchronizing signal components from a base oscillator having a normal frequency of $mf_H$, where $f_H$ is the frequency of said horizontal signal component and $m$ is an integer, apparatus for receiving the composite horizontal and vertical signal components from a remote slave generator of the type having a base oscillator which provides a nominal frequency of $mf_H$; means coupled to said master generator and to said receiving apparatus for comparing the phase of said received synchronizing signals with said master generator synchronizing signals and at a low frequency rate bearing an integral relationship to the frequency of said vertical synchronizing components; a source of carrier wave adapted for transmission to said slave generator and of nominal frequency equal to $$\frac{f_H}{n}$$

where $n$ is an integer; means coupled to said source for modulating the frequency of said carrier wave; means including a transfer circuit for coupling said phase comparison means to said frequency-modulating means in such manner as to modulate the frequency of said carrier wave in accordance with the direction and degree by which said composite slave synchronizing signals are out of phase with respect to said master composite wave; a second phase comparison means coupled to said signal-receiving apparatus and to said master generator for comparing the phase of said slave synchronizing signals and with said master signals, said second phase-comparison means being operative at a rate equal to $f_H$; means in said transfer circuit responsive to said first-named phase-comparison means for electrically disconnecting said first-named phase comparison means from said frequency-modulating means upon substantial coincidence of said slave and master synchronizing signals at said low frequency rate and for connecting said second phase comparison means to said frequency-modulating means, and means including multiplying apparatus having a factor N for multiplying such frequency modulated carrier wave and controlling the operation of said base oscillator of said second generator in accordance with such received carrier wave.

5. In combination with a master television synchronizing signal generator of the type adapted for synchronously providing horizontal and vertical television synchronizing signal components from a base oscillator having a normal frequency of $mf_H$, where $f_H$ is the frequency of said horizontal signal component and $m$ is an integer, apparatus for receiving the composite horizontal and vertical signal components from a remote slave generator of the type having a base oscillator which provides a nominal frequency of $mf_H$; means including a coincidence detector and coupled to said master generator and to said receiving apparatus for comparing the phase of said received synchronizing signals with said master generator synchronizing signals and at a low frequency rate bearing an integral relationship to the frequency of said vertical synchronizing components; a source of carrier wave adapted for transmission to said slave generator in controlling relation therewith and of nominal frequency equal to $$\frac{f_H}{n}$$

where $n$ is an integer; means coupled to said source for modulating the frequency of said carrier wave; means including a transfer circuit for coupling said phase comparison means to said frequency-modulating means in such manner as to modulate the frequency of said carrier wave in accordance with the direction and degree by which said composite slave synchronizing signals are out of phase with respect to said master composite wave; a second phase comparison means coupled to said signal-receiving apparatus and to said master generator for comparing the phase of said slave synchronizing signals and with said master signals, said second phase-comparison means being operative at a rate equal to $f_H$; and means in said transfer circuit and coupled to said coincidence detector for electrically disconnecting said first-named phase-comparison means from said frequency-modulating means upon substantial coincidence of said slave and master synchronizing signals at said low frequency rate and for connecting said second-phase comparison means to said frequency-modulating means.

6. In combination with a master television synchronizing signal generator of the type adapted for synchronously providing horizontal and vertical television synchronizing signal components from a base oscillator having a nominal frequency of $mf_H$, where $f_H$ is the frequency of said horizontal signal component and $m$ is an integer, apparatus for receiving the composite horizontal and vertical signal components from a remote slave generator of the type having a base oscillator which provides a nominal frequency of $mf_H$; means including a coincidence detector and coupled to said master generator and to said receiving apparatus for comparing the phase of said received synchronizing signals with said master generator synchronizing signals and at a low frequency rate bearing an integral relationship to the frequency of said vertical synchronizing components; a source of carrier wave of nominal frequency equal to $$\frac{f_H}{n}$$

where $n$ is an integer; means coupled to said source for modulating the frequency of said carrier wave; means including a transfer circuit for coupling said phase comparison means to said frequency-modulating means in such manner as to modulate the frequency of said carrier wave in accordance with the direction and degree by which said composite slave synchronizing signals are out of phase with respect to said master composite wave; a second phase comparison means coupled to said signal-receiving apparatus and to said master generator for comparing the phase of said slave synchronizing signals and with said master signals, said second phase-comparison means being operative at a rate equal to $f_H$; means in said transfer circuit and coupled to said coincidence detector for electrically disconnecting said first-named phase comparison means from said frequency-modulating means upon substantial coincidence of said slave and master synchronizing signals at said low frequency rate and for connecting said second phase-comparison means to said frequency-modulating means; and narrow pass band means for transmitting said frequency-modulated carrier wave to the site of said slave generator for controlling the operation of said slave generator.

7. The invention as defined by claim 6 which includes means at the site of said slave generator for multiplying the frequency of said frequency-modulated carrier wave by a factor $mn$; and means coupled to said multiplying means and to said slave base oscillator for controlling the frequency of said slave base oscillator in accordance with said multiplied carrier wave.

8. In a synchronizing system for effecting "lock-in" of a remote slave television sync generator with a local master sync generator, both of said sync generators having substantially the same timing characteristics and each of said generators having means for deriving from a base oscillator odd and even composite sync signals including horizontal and vertical sync pulses discretely related as to repetition rate with the frequency of said base oscillator and representative of interlaced scanning frames, the combination of: means at the site of said master sync generator for receiving said remote slave sync pulses; means operatively connected to said last-named means and to said master generator for comparing, at television frame rate, the phase of said slave sync pulses with respect to said master sync pulses; a second phase-comparison means coupled to said slave signal receiving means and to said master generator for comparing the phase of said slave horizontal sync pulses with said master horizontal sync pulses; an oscillator having an output of a nominal frequency equal to a fraction of said base oscillator frequency and adapted for transmission to said slave generator; means for varying the frequency of said oscillator from its nominal frequency; and transfer circuit means for successively connecting said first and second-named phase-comparison means to said oscillator frequency-varying means.

9. In a synchronizing system for effecting "lock-in" of a remote slave television sync generator with a local master sync generator, both of said sync generators having substantially the same timing characteristics and each of said generators having means for deriving from a base oscillator odd and even composite sync signals including horizontal and vertical sync pulses discretely related as to repetition rate with the frequency of said base oscillator and representative of interlaced scanning frames, the combination of: means at the site of said master sync generator for receiving said remote slave sync pulses; means operatively connected to said last-named means and to said master generator for comparing, at television frame rate, the phase of said slave sync pulses with respect to said master sync pulses; a second phase-comparison means coupled to said slave signal receiving means and to said master generator for comparing the phase of said slave horizontal sync pulses with said master horizontal sync pulses; an oscillator having an output on a nominal frequency equal to a fraction of said base oscillator frequency; means for varying the frequency of said oscillator from its nominal frequency; transfer circuit means for successively connecting said first and second-named phase-comparison means to said oscillator frequency-varying means, said first-named phase-comparison means including means for detecting coincidence of said slave sync pulses with said master sync pulses and said transfer circuit means being coupled to and responsive to said coincidence-detecting means; and means for conveying the output of said last-named oscillator to said slave generator in frequency controlling relation therewith.

10. In a synchronizing system for effecting "lock-in" of a remote slave television sync generator with a local master sync generator, both of said sync generators having substantially the same timing characteristics and each of said generators having means for deriving from a base oscillator odd and even composite sync signals including horizontal and vertical sync pulses discretely related as to repetition rate with the frequency of said base oscillator and representative of interlaced scanning frames, the combination of: means at the site of said master sync generator for receiving said remote slave sync pulses; means operatively connected to said last-named means and to said master generator for comparing, at television frame rate, the phase of said slave sync pulses with respect to said master sync pulses; a second phase-comparison means coupled to said slave signal receiving means and to said master generator for comparing the phase of said slave horizontal sync pulses with said master horizontal sync pulses; an audio oscillator having a nominal frequency equal to a fraction of said base oscillator frequency; means for varying the frequency of said oscillator from its nominal frequency; transfer circuit means means for successively connecting said first and second-named phase-comparison means to said oscillator frequency-varying means; and means including a narrow pass band channel for applying the output of said oscillator in frequency-controlling manner to said slave base oscillator.

11. The invention as defined by claim 8 wherein said frame rate comparison means includes means for deriving a pulse at the commencement of each master television field; normally non-conductive means having a pair of input terminals and an output terminal; means for applying said last-recited pulses to one of said input terminals; and means for applying said composite master sync signals to the other of said input terminals in such manner as to render said normally non-conductive means conductive upon coincidence of one of said last-recited pulses and one of said master horizontal sync pulses, whereby to produce at said output terminal a pulse at the commencement of each television frame.

12. The invention as defined by claim 8 wherein said frame rate comparison means includes means for deriving a pulse at the commencement of each master television field; normally non-conductive means having a pair of input terminals and an output terminal; means for applying said last-recited pulses to one of said input terminals; and means for applying said composite master sync signals to the other of said input terminals in such manner as to render said normally non-conductive means conductive upon coincidence of one of said last-recited pulses and one of said master horizontal sync pulses, whereby to produce at said output terminal a pulse at the commencement of each television frame; means for deriving a frame-rate sawtooth wave form in response to said slave sync pulses; a bridge circuit; and means for coupling said frame rate pulses and said frame rate sawtooth wave form to said bridge circuit.

13. The invention as defined by claim 5 wherein said transfer circuit means comprises a relay switch having a pair of fixed terminals and a movable contact; and means responsive to said coincidence detector for moving said contact from one of said fixed terminals to the other of said fixed terminals.

14. The invention as defined by claim 5 wherein said transfer circuit means comprises a relay device having a pair of fixed terminals and a movable contact, one of said fixed terminals being connected to said first phase-comparison means and the other of said fixed terminals being connected to said second phase-comparison means; a connection between said movable contact and said carrier wave frequency-modulating means; and means coupled to and responsive to said coincidence detector for moving said contact from one of said fixed terminals to the other of said fixed terminals.

15. In an electrical system, remotely located first and second wave generators, each generator including a base oscillator, apparatus for synchronizing the operation of said second generator with said first generator, said apparatus comprising: means located at the site of said first generator for receiving the wave derived from said second generator; means coupled to said wave-receiving means and to said first generator for comparing the phase of the waves from said first and second generators at a rate bearing a predetermined relationship to the frequency of said oscillators; a source of carrier wave of nominal frequency which is a fraction of said oscillator frequency; means coupled to said phase comparison means and to said carrier wave source for modulating such carrier wave with information regarding misphase between said first and second generator waves; means for transmitting such modulated carrier wave to the site of said second wave generator; means operatively associated with said second generator for controlling its operation in response to such misphase information; and means at said second generator site for receiving such carrier wave and applying it to said last-named means.

16. The invention as defined by claim 15 wherein said means for modulating such carrier wave comprises frequency-modulating apparatus and said means for controlling the operation of said second generator comprises means for multiplying such received carrier wave by a factor equal to the inverse of such fraction.

References Cited in the file of this patent

UNITED STATES PATENTS

| | | |
|---|---|---|
| 2,414,453 | France | Jan. 21, 1947 |
| 2,570,775 | De Baun | Oct. 9, 1951 |